United States Patent
Liu et al.

(10) Patent No.: US 10,677,977 B2
(45) Date of Patent: Jun. 9, 2020

(54) ILLUMINATION SYSTEM INCLUDING LIGHTGUIDE

(71) Applicant: 3M INNOVATIVE PROPERTIES COMPANY, St. Paul, MN (US)

(72) Inventors: Tao Liu, Woodbury, MN (US); Mark E. Napierala, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 214 days.

(21) Appl. No.: 15/523,949

(22) PCT Filed: Nov. 4, 2015

(86) PCT No.: PCT/US2015/058926
§ 371 (c)(1),
(2) Date: May 3, 2017

(87) PCT Pub. No.: WO2016/077110
PCT Pub. Date: May 19, 2016

(65) Prior Publication Data
US 2017/0357040 A1      Dec. 14, 2017

Related U.S. Application Data

(60) Provisional application No. 62/078,641, filed on Nov. 12, 2014.

(51) Int. Cl.
*F21V 8/00* (2006.01)
*F21S 43/237* (2018.01)
(Continued)

(52) U.S. Cl.
CPC ............ *G02B 6/001* (2013.01); *F21S 43/237* (2018.01); *F21S 43/245* (2018.01); *F21S 43/247* (2018.01); *B60Q 1/24* (2013.01); *G02B 6/0061* (2013.01)

(58) Field of Classification Search
CPC ..... G02B 6/001; G02B 6/0061; F21S 43/247; F21S 43/245; F21S 43/237; B60Q 1/24
See application file for complete search history.

(56) References Cited

U.S. PATENT DOCUMENTS 4,422,719 A    12/1983 Orcutt
4,733,332 A    3/1988 Yamashita et al.
(Continued)

FOREIGN PATENT DOCUMENTS

DE          10055561          5/2002
EP          1 205 352         5/2002
(Continued)

OTHER PUBLICATIONS

Machine English Translation (Espacenet) of EP1205352A2; Ruths, et al. (Year: 2001).*

(Continued)

*Primary Examiner* — Anh T Mai
*Assistant Examiner* — Glenn D Zimmerman
(74) *Attorney, Agent, or Firm* — Jonathan L. Tolstedt

(57) ABSTRACT

Various embodiments of lightguides and illumination systems that include lightguides are disclosed. In one or more embodiments, a lightguide can include first and second light extractors (330,340) that extract light that would otherwise be confined and propagate within the lightguide along the length of the lightguide primarily by total internal reflection. The first and second light extractors can form respective first and second patterns along a length of the lightguide. Light extracted by the first light extractors can exit the lightguide primarily along a first direction (306). Light extracted by the second light extractors can exit the lightguide primarily along a second direction (308) different from the first direction. A brightness of the total light extracted by the first (Continued)

light extractors can be larger than a brightness of the total light extracted by the second light extractors.

24 Claims, 4 Drawing Sheets

(51) Int. Cl.
F21S 43/245 (2018.01)
F21S 43/247 (2018.01)
B60Q 1/24 (2006.01)

(56) References Cited

U.S. PATENT DOCUMENTS

| | | | |
|---|---|---|---|
| 5,432,876 A | 7/1995 | Appeldorn et al. | |
| 5,845,038 A | 12/1998 | Lundin et al. | |
| 6,095,673 A | 8/2000 | Goto et al. | |
| 6,367,941 B2 | 4/2002 | Lea et al. | |
| 6,769,799 B2 | 8/2004 | Goto et al. | |
| 9,329,333 B2 | 5/2016 | Fujiuchi et al. | |
| 2001/0016105 A1 | 8/2001 | Sugiyama et al. | |
| 2004/0184286 A1 | 9/2004 | De Lamberterie | |
| 2007/0211488 A1 | 9/2007 | Cassarly | |
| 2010/0014055 A1* | 1/2010 | Overes | F21S 10/005 353/31 |
| 2010/0027287 A1* | 2/2010 | Jung | G02B 6/0006 362/551 |
| 2012/0236595 A1* | 9/2012 | Parker | G02B 6/0035 362/609 |
| 2014/0140091 A1* | 5/2014 | Vasylyev | G02B 6/001 362/606 |
| 2016/0077272 A1 | 3/2016 | Lu | |
| 2016/0299276 A1* | 10/2016 | Yamamoto | G02B 1/046 |

FOREIGN PATENT DOCUMENTS

| | | | | |
|---|---|---|---|---|
| EP | 1205352 A2 * | 5/2002 | | G02B 6/001 |
| EP | 2 530 503 | 12/2012 | | |
| EP | 2 811 221 | 12/2014 | | |
| KR | 20130055598 A * | 5/2013 | | G02B 6/0088 |
| WO | WO 2010/009067 | 1/2007 | | |

OTHER PUBLICATIONS

Glosbe German to English Disctionary translation of "Lichtleiter"; https://en.glosbe.com/de/en/Lichtleiter (Year: 2019).*

Reverso.net ; German to English translation of word "Lichtleiters" (Year: 2019).*

PCT International Search Report from PCT/US2015/058926, dated Feb. 8, 2016, 7 pages.

* cited by examiner

ILLUMINATION SYSTEM INCLUDING LIGHTGUIDE

BACKGROUND

Lightguides are increasingly being used for decorative (e.g., accent) and functional lighting in various locations, some of which require the lightguide to emit light selectively (e.g., comparatively uniformly or in a particular direction) along its length. Various mechanisms are known for enabling light that is injected into a lightguide from a light source at one end or two ends to be extracted selectively from the lightguide along its length to provide, effectively, a linear lighting device. The use of lightguides in linear lighting devices may offer advantages that include, e.g., the use of a low voltage light source such as a light emitting diode (LED) light source, separation of the light source from the area in which the lighting device is located, etc.

SUMMARY

In general, the present disclosure provides various embodiments of lightguides and illumination systems that include such lightguides. In one or more embodiments, these lightguides can include light extracting structures. The light extracting structures can include one or more various types of structures formed on and/or in the lightguides.

In one aspect, the present disclosure provides one embodiment of an elongated lightguide that extends along a length of the lightguide. The lightguide includes pluralities of first and second light extractors that extract light that would otherwise be confined and propagate within the lightguide along the length of the lightguide primarily by total internal reflection, where the first and second light extractors form respective first and second patterns along the length of the lightguide. Light extracted by the first light extractors exits the lightguide primarily along a first direction. Total light extracted by the first light extractors has a first brightness. Light extracted by the second light extractors exits the lightguide primarily along a second direction different from the first direction. Total light extracted by the second light extractors has a second brightness substantially smaller than the first brightness. When the light extracted by the second light extractors is viewed along the second direction, the second, but not the first, pattern is visible.

In another aspect, the present disclosure provides one embodiment of an illumination system that includes a light source and an elongated lightguide. The lightguide extends along a length of the lightguide and receives light from the light source from a first end of the lightguide. The lightguide includes pluralities of first and second light extractors that extract light from the light source that would otherwise be confined and propagate within the lightguide along the length of the lightguide primarily by total internal reflection. The first and second light extractors form respective first and second patterns along the length of the lightguide. Light extracted by the first light extractors exits the lightguide primarily along a first direction toward a first target area. Total light extracted by the first light extractors has a first brightness. Light extracted by the second light extractors exits the lightguide primarily along a second direction different from the first direction toward a second target area different from the first target area. Total light extracted by the second light extractors has a second brightness substantially smaller than the first brightness. Light received by the first target area from the lightguide is reflected toward the second target area along a third direction different from the first and second directions, such that when the lightguide is viewed from the second target area along the second direction, the second, but not the first, pattern is visible. And when the first target area is viewed from the second target area along the third direction, neither the first nor the second pattern is visible.

All headings provided herein are for the convenience of the reader and should not be used to limit the meaning of any text that follows the heading, unless so specified.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. The term "consisting of" means "including," and is limited to whatever follows the phrase "consisting of." Thus, the phrase "consisting of" indicates that the listed elements are required or mandatory and that no other elements may be present. The term "consisting essentially of" means including any elements listed after the phrase, and is limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances; however, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

Figure 1:
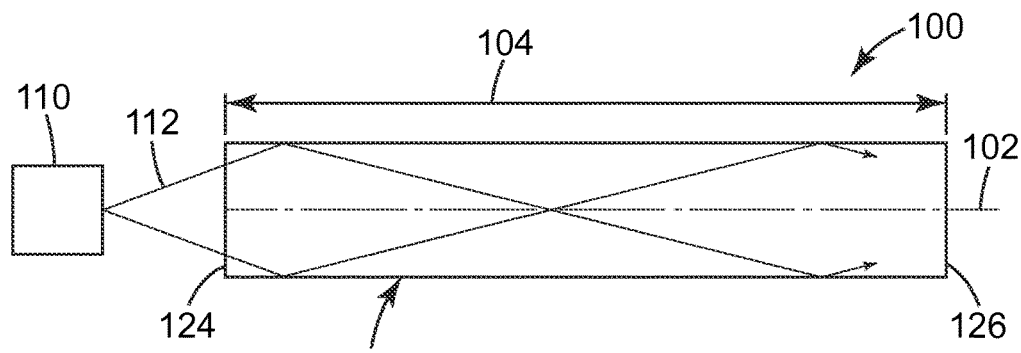
FIG. 1 is a schematic cross-section view of one embodiment of an illumination system that includes a light source and a lightguide.

In general, the present disclosure provides various embodiments of lightguides and illumination systems that include such lightguides. In one or more embodiments, these lightguides can include light extracting structures. The light extracting structures can include one or more various types of structures formed on and/or within the exemplary lightguides.

In one or more embodiments, the light extracting structures can include first light extractors and second light extractors, where light extracted by the first light extractors exits the light guide primarily along a first direction, and light extracted by the second light extractors exits the lightguide primarily along a second direction different from the first direction. In one or more embodiments, a brightness of the total light extracted by the first light extractors is larger than a brightness of the total light extracted by the second light extractors. Further, in one or more embodiments, a second pattern formed by the second light extractors is visible when viewed along the second direction, but a first pattern formed by the first light extractors is not visible when viewed along the second direction.

The various embodiments of lightguides and illumination systems described herein can be utilized in any suitable application or environment. For example, in one or more embodiments, the lightguides can be utilized as functional lighting and/or accent lighting for automobiles, airplanes, trains, etc. For example, one or more embodiments of lightguides described herein can provide step-assist lighting in large SUVs and trucks. In one or more embodiments, first light extractors of the lightguide can extract light toward the ground for indirect functional lighting, and second light extractors can extract light toward a viewer to provide accent lighting. Further, in one or more embodiments, one or more lightguides can be used as interior backseat lighting. In such embodiments, first light extractors can extract light downward toward passengers for reading or other activities, and second light extractors can extract light toward the front of the car for accent lighting while minimizing glare. Other exemplary automotive applications may include roof rack lighting, center high-mount stop lighting (CHMSLs), truck bed lighting, etc. One or more embodiments of lightguides can also be utilized, e.g., for commercial and residential buildings, etc.

Lightguides such as large core light fibers have been utilized for linear lighting applications in the areas of automotive, commercial buildings, etc. Examples include 3M™ Precision Light Elements (PLEs) that include various light extractors, and acrylic light pipes that include diffusive strips, e.g., from Tyco Electronics.

In some applications such as step-assist lighting for trucks and large SUVs, light emitted from the light fibers can be used to illuminate the ground. For these applications, users may prefer to have fully functional devices as well as an appealing appearance of the light fibers. Conventional light fibers, however, may not be able to meet these preferences. For example, traditional extraction features of these light fibers can be invisible from users when the light fibers are installed underneath the steps and light is extracted in a direction toward the ground for functional illumination. Further, some extraction features may create strong glare when viewed directly by users. Further, diffusive strips may also produce an unattractive appearance such as a fluorescent-tube look.

In one or more embodiments, a lightguide of the present disclosure can provide functional illumination and an aesthetically pleasing appearance to the viewer. For example, FIG. 1 is a schematic cross-section view of one embodiment of an illumination system 100. The system 100 includes a light source 110 and an elongated lightguide 120. The lightguide 120 extends along a length 104 of the lightguide. The lightguide 120 receives light 112 from the light source 110 from a first end 124 of the lightguide.

The light source 110 can include any suitable light source or sources capable of providing light to the lightguide 120, e.g., light emitting diodes, fluorescent lights, noble gas lights, incandescent lights, etc. Further, the illumination system 100 can include any suitable number of light sources. For example, in one or more embodiments, system 100 can include a second light source (not shown) that is configured to direct light into the light guide 120 at a second end 126 of the lightguide. Further, the light source 110 can include any suitable optical element or elements that assist in providing light to the lightguide 120, e.g., lenses, filters, brightness enhancement films, polarizers, etc.

The elongated lightguide 120 extends along the length 104 of the lightguide and receives light 112 from the light source 110 from the first end 124 of the lightguide. Lightguide 120 can be any suitable lightguide or lightguides and can have any suitable cross-sectional shape, circular, polygonal, mushroom, etc. In one or more embodiments, the lightguide 120 has a circular cross-section in a direction perpendicular to the length 104 of the lightguide. Further, in one or more embodiments, the lightguide 120 can be an optical fiber.

The lightguide 120 can include (e.g., be formed of) any suitable material or combination of materials, e.g., one or more polymers (e.g., urethanes, acrylics, polycarbonates, etc.), glass, etc. Further, the lightguide 120 can be flexible (e.g., resilient, etc.) or rigid (e.g., inflexible, unbendable, not resilient, etc.). The lightguide 120 can be formed, or manufactured, using any suitable process, e.g., molding, extruding, printing, deposition, etc. In one or more embodiments, the lightguide 120 can be formed by injection molding.

The lightguide 120 can define the length 104 extending from the first end 124 to the second end 126. The length 104 may be any suitable length, e.g., greater than or equal to about 200 millimeters (mm), greater than or equal to about 500 mm, greater than or equal to about 1000 mm, greater than or equal to about 2 meters, greater than or equal to about 3 meters, greater than or equal to about 5 meters, greater than or equal to about 10 meters, greater than or equal to about 20 meters, greater than or equal to about 30 meters, greater than or equal to about 50 meters, etc. In one or more embodiments, the length 104 can be less than or equal to about 1000 mm, less than or equal to about 2 meters, less than or equal to about 3 meters, less than or equal to about 5 meters, less than or equal to about 10 meters, less than or equal to about 20 meters, less than or equal to about 30 meters, less than or equal to about 50 meters, less than or equal to about 100 meters, etc.

In one or more embodiments, light 112 emitted by the light source 110 is directed into the lightguide 120 and propagates through the lightguide along a main axis 102 substantially coincident with a longitudinal axis of the lightguide. The light 112 propagates through the lightguide 120 with a maximum cone angle measured from the main axis 102 that is determined by the critical angle necessary for total internal reflection. This angle may be derived by first calculating the critical angle as is known by those skilled in the art. In other words, the light 112 is confined and propagates within the lightguide 120 along the length 104 of the lightguide primarily by total internal reflection.

Further, one or more portions of the length 104 or the entire length of the lightguide 120 can be configured to emit light therefrom. The one or more portions of the length 104 that are configured to emit light may be referred to as "active." In other words, portions of the lightguide 120 may not be configured to emit light therefrom but may be configured to transfer light down the length of the lightguide along the main axis 102 to other portions that are configured to emit light therefrom. Thus, the lightguide 120 may be defined in terms of "active" and "inactive" portions, regions, lengths, etc.

In one or more embodiments, the lightguide 120 can include a single active portion, and an active length may be define as a distance between a first light extracting structure closest to an input face, e.g., first end 124, of the lightguide and a last light extracting structure farthest from the input face. The lightguide 120 can be built, or configured, for a plurality of different applications requiring different lighting requirements such as active lengths. Thus, the lightguide 120 can have an active length that is greater than or equal to about 200 millimeters (mm), greater than or equal to about 500 mm, greater than or equal to about 1000 mm, greater than or equal to about 2 meters, greater than or equal to about 3 meters, greater than or equal to about 5 meters, greater than or equal to about 10 meters, greater than or equal to about 20 meters, greater than or equal to about 30 meters, greater than or equal to about 50 meters, etc. In one or more embodiments, the active length can be less than or equal to about 1000 mm, less than or equal to about 2 meters, less than or equal to about 3 meters, less than or equal to about 5 meters, less than or equal to about 10 meters, less than or equal to about 20 meters, less than or equal to about 30 meters, less than or equal to about 50 meters, less than or equal to about 100 meters, etc.

The lightguide 120 can include one or more portions or regions that include various materials, each material having various properties. For example, the lightguide 120 can include a core and cladding surrounding at least a portion of the core (not shown). The core can include materials such as, e.g., one or more polymers (e.g., urethanes, acrylics, polycarbonates, etc.), glass, etc. In one or more embodiments, the core can be optically homogenous (e.g., a refractive index can be substantially the same throughout, and a refractive index of the core material may vary less than or equal to 15%, less than or equal to 10%, less than or equal to 7%, less than or equal to 5%, less than or equal to 3%, less than or equal to 2%, less than or equal to 1%, etc.). The cladding can include any suitable material or combination of materials, e.g., polymers (e.g., low refractive index polymers), metals, etc. In one or more embodiments, the cladding can include (e.g., be formed of) metal such as, e.g., silver, aluminum, gold, alloys thereof, etc., and may be configured to have a high reflectance (e.g., greater than or equal to about 90%). When light 112 is injected or delivered to one or both the ends 124, 126 of the lightguide 120, the light can propagate in either direction along the main axis 102 (e.g., depending on which end the light was injected) by total internal reflection, e.g., by the core and/or cladding.

The core can have a selected, or particular, index of refraction. The index of refraction of the core can be in a range from about 1.3 to about 1.65, about 1.4 to about 1.6, about 1.5 to about 1.6, about 1.5 to about 1.55, etc. For example, the index of refraction of the core may be greater than or equal to about 1.2, greater than or equal to about 1.3, greater than or equal to about 1.35, greater than or equal to about 1.4, greater than or equal to about 1.45, greater than or equal to about 1.5, etc. and/or less than or equal to about 1.7, less than or equal to about 1.65, less than or equal to about 1.6, less than or equal to about 1.55, etc.

The core and/or cladding, taken alone or together, may have a selected, or particular, optical absorption coefficient. For example, the optical absorption coefficient at a wavelength of 500 nanometers (nm) may be greater than or equal to about 0.01 $cm^{-1}$, greater than or equal to about 0.015 $cm^{-1}$, greater than or equal to about 0.018 $cm^{-1}$, greater than or equal to about 0.019 $cm^{-1}$, greater than or equal to about 0.02 $cm^{-1}$, greater than or equal to about 0.025 $cm^{-1}$, greater than or equal to about 0.03 $cm^{-1}$, etc. in one or more embodiments, the optical absorption coefficient can be less than or equal to about 0.04 $cm^{-1}$, less than or equal to about 0.035 $cm^{-1}$, less than or equal to about 0.03 $cm^{-1}$, less than or equal to about 0.025 $cm^{-1}$, less than or equal to about 0.02 $cm^{-1}$, etc.

Further, the lightguide 120 can be described in relative terms using the active length and the optical absorption coefficient. For example, the lightguide 120 may have an optical absorption coefficient $\theta$ at 500 nm and an active length d defined as a distance between a first light extractor closest to an input face such as the first end 124 of the lightguide 120 and a last light extractor farthest from the input face, wherein $\theta d$ is greater than or equal to about 1, greater than or equal to about 1.5, greater than or equal to about 2, greater than or equal to about 2.5, greater than or equal to about 3, greater than or equal to about 3.5, greater than or equal to about 4, etc. In one or more embodiments, $\theta d$ can be less than or equal to about 5, less than or equal to about 4.5, less than or equal to about 4, less than or equal to about 3.5, less than or equal to about 3, less than or equal to about 2.5, less than or equal to about 2, etc.

The cladding may have a selected, or particular, index of refraction. The index of refraction of the cladding may be in a range from about 1 to about 1.6, about 1 to about 1.5, about 1 to about 1.4, about 1 to about 1.3, about 1 to about 1.2, about 1 to about 1.1, etc. For example, the index of refraction of the cladding may be greater than or equal to about 1, greater than or equal to about 1.05, greater than or equal to about 1.1, greater than or equal to about 1.2, etc. and/or less than or equal to about 1.7, less than or equal to about 1.6, less than or equal to about 1.5, less than or equal to about 1.4, less than or equal to about 1.3, less than or equal to about 1.25, less than or equal to about 1.2, less than or equal to about 1.15, less than or equal to about 1.1, less than or equal to about 1.05, etc.

Figure 2:
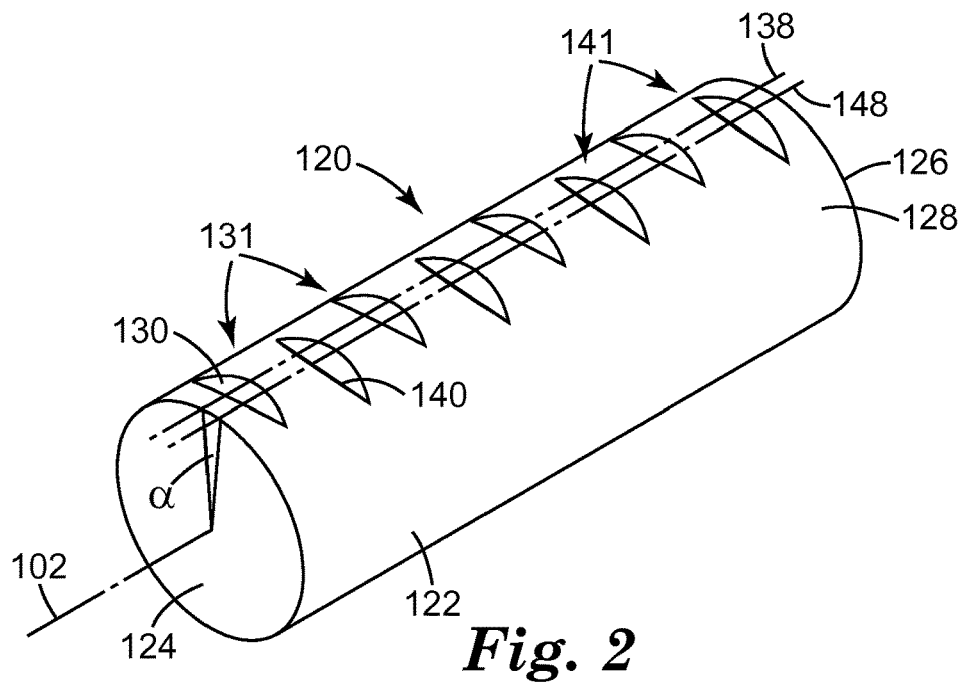
FIG. 2 is a schematic perspective view of the lightguide of FIG. 1.
Figure 3:
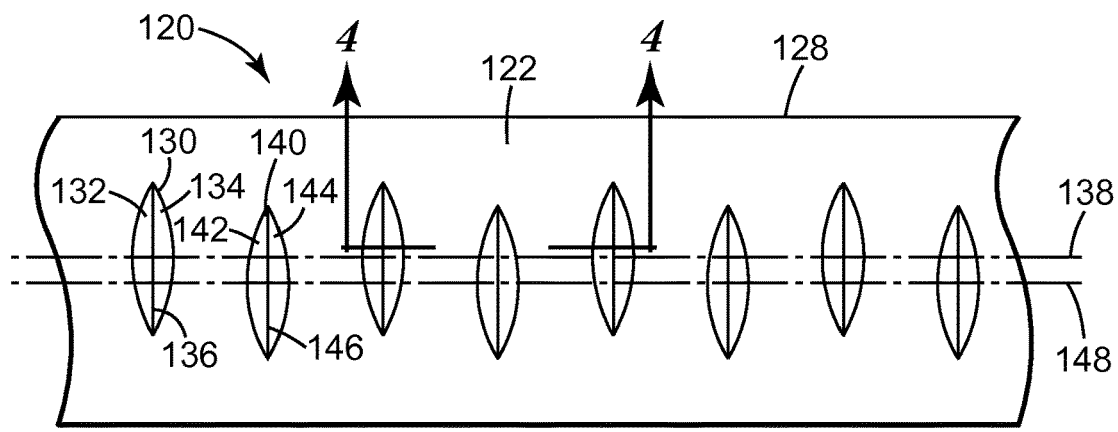
FIG. 3 is a schematic plan view of a portion of the lightguide of FIG. 1.
Figure 4:
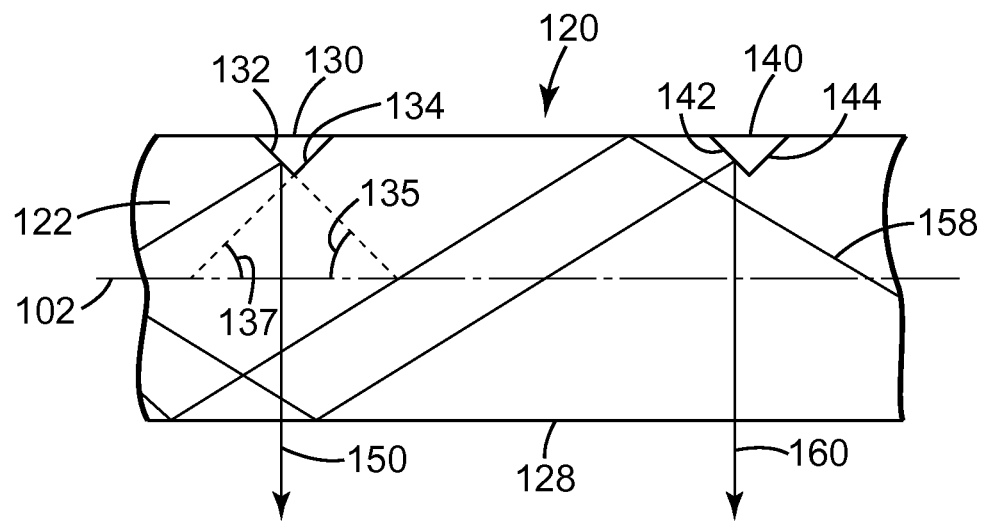
FIG. 4 is a schematic cross-section view of a portion of the lightguide of FIG. 1.

In one or more embodiments, the lightguide 120 can include one or more light extractors that extract light 112 from the light source 110 that would otherwise be confined and propagate within the lightguide along the length 104 of the lightguide primarily by total internal reflection. For example, FIGS. 2-4 are various schematic views of the lightguide 120. The lightguide 120 includes a body 122 that includes the first end 124 and the second end 126, and an exterior surface 128 extending longitudinally along the length 104 of the lightguide. In one or more embodiments, the exterior surface 128 corresponds to the circumferential surface of the lightguide 120. Further, in one or more embodiments, the exterior surface 128 can be an optically smooth surface. As used herein, the term "optically smooth surface" refers to a surface that is capable of reflecting light incident on the surface with minimal scattering or diffusion such as is possible when the surface roughness is small compared to the wavelength of light.

Lightguide 120 also includes a plurality of first light extractors 130 and a plurality of second light extractors 140. The first and second light extractors 130, 140 are configured to extract light 112 that would otherwise be confined and propagate within the lightguide along the length 104 of the lightguide primarily by total internal reflection. The lightguide 120 can include any suitable type and number of light extractors. For example, in one or more embodiments, one or more of the first and second light extractors 130, 140 can include a notch formed in the exterior surface 128 of the lightguide 120. In one or more embodiments, one or more of the first and second light extractors 130, 140 can include a protrusion formed on the exterior surface 128 of the lightguide 120 as is further described herein.

The light extractors 130, 140 can take any suitable shape or combination of shapes, e.g., linear, triangular, etc. Further, in one or more embodiments, one or more of the first light extractors 130 and second light extractors 140 can be a diffuse extractor, e.g., diffusive notches, printed inks, etc. In one or more embodiments, one or more light extractors can also be a colored light extractor, e.g., one or more light extractors can include surfaces having inks printed thereon to provide any desired color.

The first and second light extractors 130, 140 can extract light using any suitable technique or combination for techniques. For example, in one or more embodiments, at least one of the first and second light extractors 130, 140 can extract light primarily by scattering the light. In one or more embodiments, at least one of the first and second light extractors 130, 140 can extract light primarily by reflecting the light. And in one or more embodiments, at least one of the first and second light extractors 130, 140 can extract light primarily by refracting the light. Further, the first light extractors 130 can extract light using a different technique from that of the second light extractors 140. For example, in one or more embodiments, the first light extractors 130 can extract light primarily by scattering the light, and the second light extractors 140 can extract light primarily by reflecting the light.

In one or more embodiments, the first light extractors 130 form a first pattern 131 along the length 104 of the lightguide 120, and the second extractors 140 form a second pattern 141 along the length of the lightguide. The first and second patterns 131, 141 can include any suitable patterns. For example, in one or more embodiments, at least one of the first and second patterns 131, 141 can include a straight line pattern. Further, in one or more embodiments, at least one of the first and second patterns can include a wavy line pattern. In one or more alternative embodiments, one or both of the first and second light extractors 130, 140 can be arranged randomly along the length 104 of the lightguide 120.

One or both of the first and second patterns 131, 141 can include any suitable shape or combination of shapes. For example, in one or more embodiments, one or both of the first and second patterns 131, 141 can include indicia. Any suitable indicia can be included or formed by one or both of the first and second patterns 131, 141, e.g., letters, text, logos, etc. The indicia may, in one or more embodiments, be compressed in a direction orthogonal to the length 104 of the lightguide 120 to be viewed at a desired size and configuration through the lightguide as the lightguide can act as a cylindrical lens that distorts the patterns. In one or more embodiments, at least one of the first pattern 131 and the second pattern 141 can be magnified by a lens or lenses attached to the exterior surface 128 of the lightguide 120 such that the pattern appears to float when viewed through a thickness of the lightguide (e.g., lens 423 of illumination system 400 of FIG. 7).

In the illustrated embodiment, the first light extractors 130 are discrete and spaced apart and arranged along a first axis 138 along the length 104 of the lightguide 120. Further, in one or more embodiments, the second light extractors 140 are discrete and spaced apart and arranged along a different second axis 148 along the length 104 of the lightguide 120.

The first and second axes 138, 148 can be disposed in any suitable location on the surface 128 of the lightguide 120. Further, in one or more embodiments, the first and second axes 138, 148 can subtend any suitable angle α at the main axis 102. For example, in one or more embodiments, the first and second axes 138, 148 can subtend an angle between 45 to 90 degrees at the main axis 102.

Referring to FIGS. 3-4, the lightguide 120 includes the first light extractors 130 centered about the first axis 138 along exterior surface 128 of the lightguide. Each first light extractor 130 includes a first reflective surface 132 that extends into the body 122 of the lightguide 120. First reflective surface 132 can, in one or more embodiments, be a substantially optically smooth surface, meaning that it is capable of reflecting light with minimal losses due to scattering or diffusion. Surface 132 can also be disposed at any useful angle 135 between 0 and 90 degrees relative to the main axis 102. In one or more embodiments, each first light extractor 130 also includes a second surface 134 that may or may not be optically reflective. Surfaces 132, 134 can intersect to define the base 136 of optical element 130. Surface 134 can be disposed at any suitable angle 137 between 0 to 90 degrees relative to the main axis 102.

Lightguide 120 can also include second light extractors 140 centered about the second axis 148 along the exterior surface 128 of the lightguide. In one or more embodiments, each second light extractor 140 includes a first reflective surface 142 that extends into the body 122 of the lightguide 120. The first reflective surface 142 can be a substantially optically smooth surface, meaning that it is capable of reflecting light with minimal losses due to scattering or diffusion. Surface 142 can also be disposed at any useful angle between 0 and 90 degrees relative to the main axis 102. Each second light extractor 140 can also include a second surface 144 that may or may not be optically reflective. Surfaces 142, 144 intersect to define a base 146 of second light extractor 140. Surface 142 can also be disposed at any useful angle between 0 and 90 degrees relative to the main axis 102.

As shown in FIG. 4, a first portion of the light propagating through the lightguide 120, represented by light ray 150, is incident on the first reflective surface 132 of first light extractor 130 and is reflected through the lightguide 120 such that it strikes the exterior surface 128 of the lightguide at an angle greater than the critical angle required for continued propagation through the lightguide and thus is at least partially refracted from the lightguide. The second portion of the light propagating through the lightguide 120, represented by light ray 158, strikes the exterior surface 128 of lightguide 120 and continues to propagate through the lightguide. And a third portion of the light propagating through the lightguide 120, represented by light ray 160, becomes incident on a reflective surface 142 of the second light extractor 140 and is reflected through the lightguide such that it strikes the exterior surface 128 of the lightguide at an angle less than the critical angle required for continued propagation and thus is at least partially refracted from the lightguide.

Surfaces 132, 134, 142, and 144 of light extractors 130, 140 may be coated with a specularly reflective substance (e.g. silver, aluminum) such that light striking these surfaces is specularly reflected. If these surfaces are not coated with a specularly reflective substance, light incident on the reflective surface at an angle less than the critical angle defined by Snell's law will be transmitted (and refracted) through the light extractors 130, 140. By contrast, light incident on the reflective surface at an angle greater than the critical angle defined by Snell's law will be totally internally reflected, much like the light depicted by ray 158. In one or more embodiments, each light extractor 130, 140 can have an extraction efficiency of less than 5%, or less than 4%, or less than 3%, or less than 2%, or less than 1.5%, or less than 1%, or less than 0.5%, where extraction efficiency of a light extractor refers to the ratio of the power of light extracted by the extractor to the power of light within the lightguide at the extractor. For example, an extraction efficiency of 1% means that 1% of the light at the extractor is extracted by the extractor.

It will be appreciated that the morphology of each light extractor (e.g., the angle of inclination of the first reflective surfaces 132, 142 and, in one or more embodiments, the second surfaces 134, 144; whether the reflective surfaces are planar or curved; the cross-sectional area of each reflective surface, etc.) will influence the amount and direction of light emitted from the lightguide 120 at that particular point. See, e.g. U.S. Pat. No. 5,432,876 to Appeldorn et al. Consequently, the amount and direction of the light extracted from the lightguide 120 can be controlled by selecting the appropriate notch or protrusion, as well as the pattern and spacing of the notches or protrusions along the lightguide. Although each notch or protrusion on or in a given lightguide would ordinarily be of similar morphology, any useful combination of light extractors may be employed.

As described herein, the exemplary lightguide 120 can include one or more (e.g., one, two or more, a plurality, etc.) light extractors. For example, in one or more embodiments, the lightguide 120 can include greater than or equal to about 50 light extractors, greater than or equal to about 100 light extractors, greater than or equal to about 150 light extractors, greater than or equal to about 200 light extractors, greater than or equal to about 250 light extractors, greater than or equal to about 300 light extractors, greater than or equal to about 400 light extractors, greater than or equal to about 500 light extractors, greater than or equal to about 600 light extractors, greater than or equal to about 1000 light extractors, etc. Further, in one or more embodiments, the lightguide 120 can include less than or equal to about 2500 light extractors, less than or equal to about 2000 light extractors, less than or equal to about 1500 light extractors, less than or equal to about 1250 light extractors, less than or equal to about 1000 light extractors, less than or equal to about 900 light extractors, less than or equal to about 750 light extractors, less than or equal to about 500 light extractors, less than or equal to about 250 light extractors, etc.

Further, the first and second light extractors 130, 140 may be described in terms of density, i.e., light extractors per measure of distance. For example, the lightguide 120 can include any combination of first and second light extractors 130, 140, where the lightguide includes greater than or equal to about 1 light extractor per centimeter (cm), greater than or equal to about 2 light extractors per cm, greater than or equal to about 3 light extractors per cm, greater than or equal to about 5 light extractors per cm, greater than or equal to about 7 light extractors per cm, greater than or equal to about 10 light extractors per cm, greater than or equal to about 15 light extractors per cm, etc. Further, in one or more embodiments, the lightguide 120 can include any combination of first and second light extractors 130, 140, where the lightguide includes less than or equal to about 25 light extractors per cm, less than or equal to about 20 light extractors per cm, less than or equal to about 15 light extractors per cm, less than or equal to about 12 light extractors per cm, less than or equal to about 10 light extractors per cm, less than or equal to about 7 light extractors per cm, less than or equal to about 6 light extractors per cm, less than or equal to about 5 light extractors per cm, etc.

Further, the light extractors 130, 140 can be described in terms of separation between the structures. The separation (e.g., linear distance) between the light extractors 130, 140 can be in the range of about 0.5 mm to about 30 mm. For example, the separation between the light extractors of one or both of the first and second light extractors 130, 140 can be greater than or equal to about 0.1 mm, greater than or equal to about 0.2 mm, greater than or equal to about 0.3 mm, greater than or equal to about 0.5 mm, greater than or equal to about 0.75 mm, greater than or equal to about 1 mm, greater than or equal to about 2 mm, greater than or equal to about 3 mm, greater than or equal to about 5 mm, greater than or equal to about 10 mm, greater than or equal to about 15 mm, etc. Further, in one or more embodiments, the separation between light extractors of one or both of the first and second light extractors 130, 140 can be less than or equal to about 30 mm, less than or equal to about 25 mm, less than or equal to about 20 mm, less than or equal to about 15 mm, less than or equal to about 12.5 mm, less than or equal to about 10 mm, less than or equal to about 7.5 mm, less than or equal to about 5 mm, etc.

The separation between the light extractors of one or both of the first and second light extractors 130, 140 can vary along the length 104 of the body 122 of the lightguide 120. For example, the separation may change linearly along the length 104 of the body 122 (e.g., from the first end 124 to the second end 126, from the first end to a central portion, from the second end to a central portion, etc.). In one or more embodiments, separation between two neighboring light extractors can be different from a separation between two other neighboring light extractors.

As described herein, the first and second light extractors 130, 140 of the lightguide 120 can be described as notches. More specifically, to define the notch, each of the first surface 132 and the second surface 134 of first light extractor 130 can extend from the exterior surface 128 of the lightguide 120 toward the main axis 102 resulting in the light extractor being a notch. In one or more embodiments, the notch may resemble a "V"-shaped groove. In other words, the light extractor 130 may have a V-shaped cross-section in a direction parallel to the main axis 102.

Figure 5:
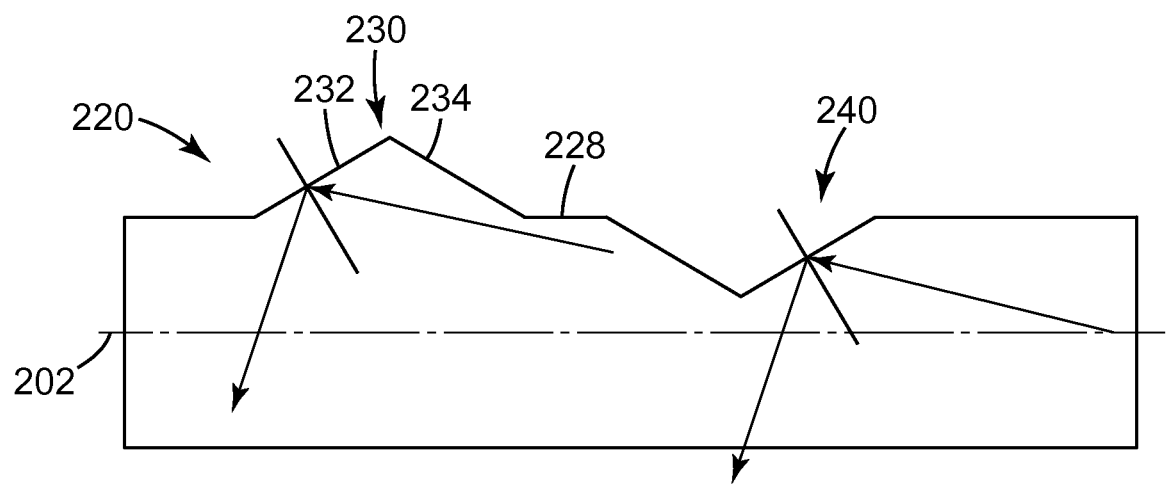
FIG. 5 is a schematic cross-section view of another embodiment of a lightguide.

As shown in FIGS. 2-4, each of the light extractors of the first and second light extractors 130, 104 is a notch. In other embodiments, one or more of the light extractors can be notches, while a remainder of the light extractors can be protrusions. For example, FIG. 5 is a schematic cross-section view of a portion of another embodiment of a lightguide 220. All of the design considerations and possibilities regarding the lightguide 120 of FIGS. 1-4 apply equally to the lightguide 220 of FIG. 5. The lightguide 220 includes two different types of light extractors. The portion of the lightguide 220 shown includes a first light extractor 230 that is a protrusion, and a second light extractor 240 that is a notch. The protrusion 230 may be defined as including a first surface 232 and a second surface 234, each surface extending from the exterior surface 228 lightguide 220 away from main axis 202, resulting in the light extractor being a protrusion.

As shown, the protrusion 230 may operate, or function, in a substantially similar manner as the notch 240. For example, the protrusion 230 may redirect, or reflect, light traveling, or propagating, in either direction along the main axis 202 of the lightguide 220. The protrusion 230 may define the first surface 232 configured to direct light propagating in a first direction along the lightguide 220 out of the lightguide, and a second surface 234 configured to direct light propagating in a second direction opposite the first direction along the lightguide out of the lightguide.

More specifically, the first and second surfaces 232, 234 of the protrusion 230 may define angles formed with the main axis 202 that are substantially similar to the angles described herein regarding the first and second surfaces 132, 134 of the first light extractor 130. For example, in one or more embodiments, the first and second surfaces 232, 234 can form an angle with the main axis 202, or an axis extending parallel to the main axis 202, that may be less than or equal to about 45 degrees and greater than or equal to about 10 degrees.

Figure 6:
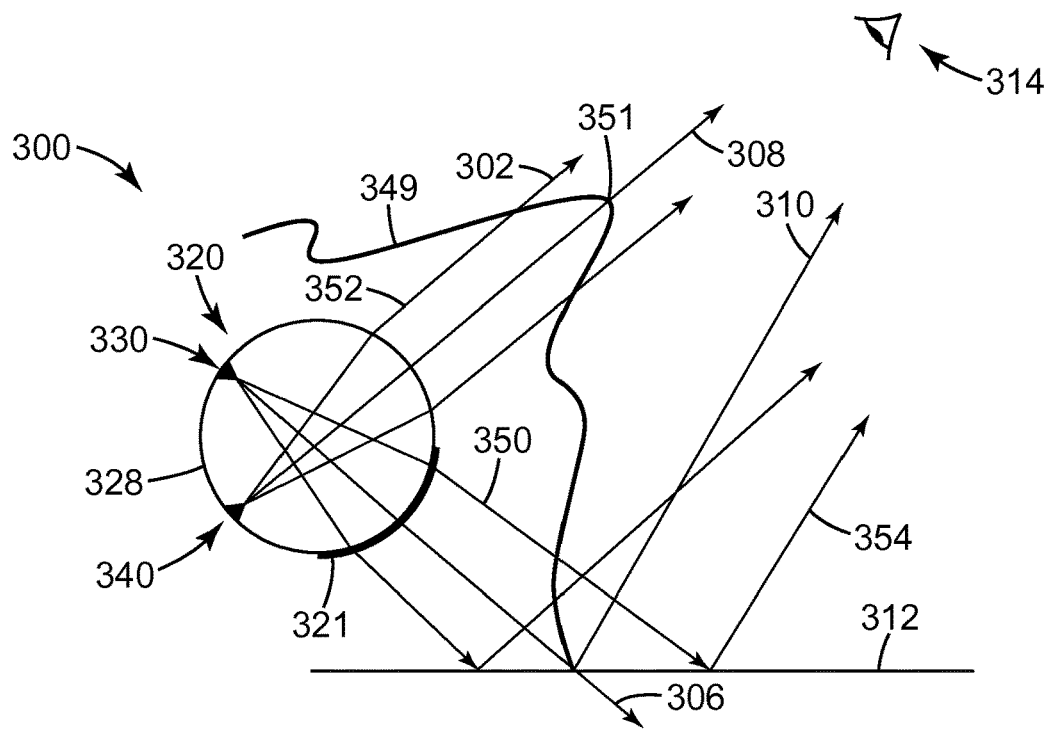
FIG. 6 is a schematic cross-section view of another embodiment of an illumination system.

The lightguides and illuminations systems described herein can be configured to provide any suitable pattern or patterns of extracted light. For example, FIG. 6 is a schematic cross-section view of one embodiment of an illumination system 300. All of the design considerations and possibilities regarding illumination system 100 of FIGS. 1-4 apply equally to illumination system 300 of FIG. 6. Illumination system 300 includes a light source (not shown), and an elongated lightguide 320. The elongated lightguide 320 extends along the length of the lightguide (i.e., in a direction orthogonal to the plane of the figure) and receives light from the light source from a first end of the lightguide (e.g., first end 124 of lightguide 120 of FIG. 1). The lightguide 320 includes a plurality of first light extractors 330 and a plurality of second light extractors 340. The first and second light extractors 330, 340 extract light from the light source that would otherwise be confined and propagate within the lightguide along the length of the lightguide primarily by total internal reflection. As stated herein, the first and second light extractors 330, 340 can form respective first and second patterns along the length of the lightguide 320.

As illustrated in FIG. 6, light 350 extracted by the first light extractors 330 exits the lightguide 320 primarily along a first direction 306 toward a first target area 312. In other words, first direction 306 is the direction along which the maximum peak intensity of light 350 travels as described further herein in reference to light 352 extracted by second light extractors 340 that exits the lightguide 320. The first target area 312 can be any suitable location. For example, in one or more embodiments, the first target area 312 can be pavement adjacent a vehicle that includes illumination system 300.

The total light extracted by the first light extractors 330 can have a first brightness. Any suitable technique or combination of techniques can be utilized to determine the first brightness of the light extracted by the first light extractors 330. As used herein, the term "brightness" refers to the total amount of extracted light in terms of power (watts). The first brightness can include any suitable value or values.

In one or more embodiments, light 352 extracted by the second light extractors 340 exits the lightguide 320 primarily along a second direction 308 toward a second target area 314. In other words, first direction 308 is the direction along which the maximum peak intensity of light 352 travels. For example, as shown in FIG. 6, the second direction 308 is the direction along which maximum peak intensity 351 of curve 349 travels, where the area under the curve 349 is the intensity profile of light extracted by the second light extractors 340 that exits the lightguide 320. In one or more embodiments, the second target area 314 is different from the first target area 312. The second target area 314 can be any suitable location. In one or more embodiments, the second target area 314 can be a viewer of a vehicle that includes the illumination system 300. In one or more embodiments, the first direction 306 is different from the second direction 308. Total light extracted by the second light extractors 340 can have a second brightness. The second brightness can include any suitable value or values.

The first brightness can be the same as or different from the second brightness. In one or more embodiments, the second brightness is substantially smaller than the first brightness. For example, in one or more embodiments, the second brightness is less than 50% of the first brightness. In one or more embodiments, the second brightness is less than 30% of the first brightness. Further, in one or more embodiments, the second brightness is less than 10% of the first brightness.

In one or more embodiments, when the light 352 extracted by the second light extractors 340 is viewed along the second direction 308, the second pattern formed by the second light extractors 340 is visible but the first pattern formed by the first light extractors 330 is not visible. Further, in one or more embodiments, when light 350 extracted by the first light extractors 330 is viewed along the first direction 306, the first pattern formed by the first light extractors is visible but the second pattern formed by the second light extractors 340 is not visible as the light extracted by the second light extractors 340 exits the lightguide 320 primarily along the second direction 352. And in one or more embodiments, when the light extracted by the first light extractors 330 is viewed along the first direction 306, neither the first pattern formed by the first light extractors nor the second pattern formed by the second light extractors 340 is visible. For example, as is further described herein, a diffuser or diffuse coating can be positioned in the optical path (i.e., the first direction 306) of the light extracted by the first light extractors 330 such that the first pattern is not visible, and the second pattern is also not visible along the first direction 306 because light 352 extracted by the second light extractors 340 exits the lightguide 320 primarily along the second direction 308. Further, in one or more embodiments, when the light 350 extracted by the first light extractors 330 is viewed from a viewing position along the first direction 306, the first pattern formed by the first light extractors is visible and has a brightest visible portion. In such embodiments, when the viewing position moves in a direction parallel to the length of the lightguide 330 (i.e., in a direction orthogonal to the plane of the figure), the brightest visible portion also moves in the same direction.

In one or more embodiments, light 350 received by the first target area 312 from the lightguide 320 can be reflected as light 354 toward the second target area 314 along a third direction 310. In one or more embodiments, the third direction 310 can be different from the first and second directions 306, 308. In such embodiments, when the lightguide 320 is viewed from the second target area 314 along the second direction 308, the second pattern formed by the second light extractors 340 is visible but the first pattern formed by the first light extractors 330 is not visible. Further, in one or more embodiments, when the first target area 312 is viewed from the second target area 314 along the third direction 310, neither the first pattern formed by the first light extractors 330 nor the second pattern formed by the second light extractors 340 is visible. In one or more embodiments, the first pattern formed by the first light extractors 330 is not visible when viewing the first target area 312 from the second target area 314 because the light 354 is diffusely reflected by the first target area. Further, in one or more embodiments, the second pattern formed by the second light extractors 340 is not visible when viewing the first target area 312 from the second target area 314 because the aperture of the eye or eyes of the viewer may not receiver the light 352 extracted by the second light extractors.

As mentioned herein, the disclosed lightguides can include any suitable coating or coatings disposed on or in a surface of the lightguide. For example, in the embodiment illustrated in FIG. 6, a coating 321 is disposed on an exterior surface 328 of the lightguide 320. The coating 321 can include any suitable material or combination of materials. For example, in one or more embodiments, the coating 321 can be a diffuse coating that at least partially diffuses light exiting the lightguide through the portion of the outer surface 328 that includes the coating. In one or more embodiments, the coating 321 can be any suitable filter or filters. For example, in one or more embodiments, the coating 321 can be a color filter disposed on the outer surface 328 of the lightguide 320 such that light extracted, e.g., by the first light extractors 330 is a desired color when reaching the first target area 312, e.g., red, green, blue, etc. In one or more embodiments, additional filters can be disposed on the outer surface 328 of the lightguide 320 such that light extracted by the second light extractors 340 passes through a color filter to provide light of a desired color to the second target area 314. Further, in one or more embodiments, the coating 321 can include an optical film, e.g., multilayer optical film, brightness enhancement film, etc.

As mentioned herein, the first light extractors 330 extract light 350 through the exterior surface 328 toward the first target area 312 along the first direction 306. This light 350 can be reflected by the first target area 312 along the third direction 310 and become visible to a viewer positioned at the second target area 314. In one or more embodiments, the second light extractors 340 can be positioned such that light 352 extracted by the second light extractors is directed toward the viewer at the second target area 314 without contributing substantially any light to the first target area 312. As a result, the first light extractors 330 can provide functional lighting by lighting the first target area 312 adjacent a vehicle, for example, and the second light extractors 340 can provide accent lighting visible to a viewer of such vehicle.

Figure 7:
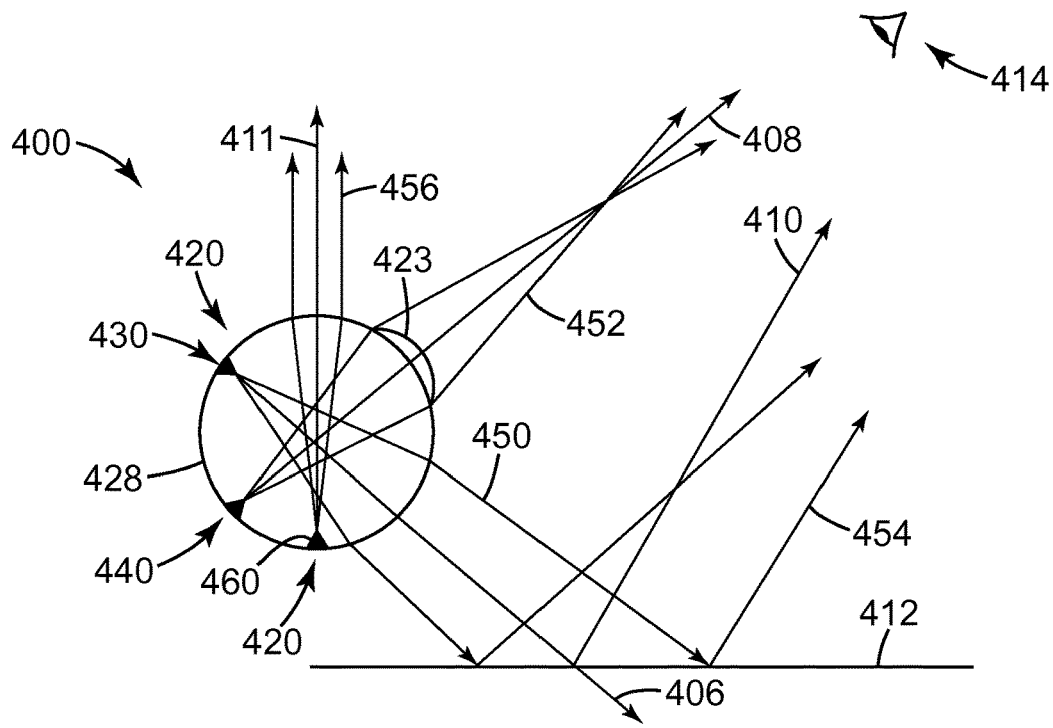
FIG. 7 is a schematic cross-section view of another embodiment of an illumination system.

As mentioned herein, the lightguides of the present disclosure can include any suitable number and type of extractors. For example, FIG. 7 is a schematic cross-section view of another embodiment of an illumination system 400. All of the design considerations and possibilities regarding the illumination system 100 of FIG. 1 and the illumination system 300 of FIG. 6 apply equally to the illumination system 400 of FIG. 7. One difference between illumination system 400 of FIG. 7 and system 300 of FIG. 6 is that system 400 includes a lightguide 420 that includes first light extractors 430, second light extractors 440, and third light extractors 460. The third light extractors 460 can include any suitable light extractors described herein. Further, the third light extractors 460 can be positioned in any suitable location on or in the lightguide 420. The third light extractors 460 can extract light that would otherwise be confined and propagate within the lightguide along the length of the lightguide 420 primarily by total internal reflection. Further, the third light extractors 460 can form a third pattern along the length of the lightguide 420. Light 456 extracted by the third light extractors 460 exits the lightguide 420 primarily along a third direction 411.

In one or more embodiments, the first light extractors 430 extract light 450 that exits the lightguide 420 primarily along a first direction 406, and the second light extractors 440 extract light 452 that exits the lightguide primarily along a second direction 408. The first direction 406 can be the same as one or both of the second direction 408 and third direction 411. Alternatively, in one or more embodiments, the first direction 406 can be different from the second direction 408 and/or the third direction 411. Further, in one or more embodiments, the third direction 411 can be different from the first and second directions 406, 408.

In one or more embodiments, light 450 received by a first target area 412 from the lightguide 420 can be reflected as light 454 toward a second target area 414 along a fourth direction 410. In one or more embodiments, the fourth direction 410 can be different from the first, second, and third directions 406, 408, 411, or the same as one or more of the first, second, and third directions.

Another difference between illumination system 300 of FIG. 6 and system 400 of FIG. 7 is that system 400 includes a lens 423 disposed on an exterior surface 428 of the lightguide 420. In the embodiment illustrated in FIG. 7, the lens 423 is disposed in the optical path of the light 452 extracted by the second light extractors 440. Any suitable lens or combination of lenses can be disposed on the exterior surface 428 or formed in the exterior surface 428 of the lightguide 420. In one or more embodiments, the lens 423 may extend along a length of the lightguide 420 (i.e., in a direction orthogonal to the plane of the figure). As illustrated, the lens 423 is a collimating lens that collimates the light 452 extracted by the second light extractors 440. Additional lenses can be disposed or formed on or in the outer surface 428 of the lightguide 420 in the optical path of the light extracted by one or both of the first light extractors 430 and third light extractors 460.

EXAMPLES

Example 1: Laser-Etched Lightguide with First and Second Light Extractors

Figure 8A:
FIGS. 8A-B are photographs of a lightguide of Example 1.
Figure 8B:

A 7 mm diameter acrylic rod was used as a lightguide in this example. First, 670 notches were formed in the rod's surface using a CO2 laser to provide first light extractors. Then, 12 notches were formed in the rod's surface using a razor blade to provide second light extractors. The first light extractors were arranged along a first axis and the second light extractors were arranged along a second axis. The first and second axes subtended an angle of 45 degrees at a main axis of the rod. An LED (Osram CN5M available from Osram Opto Semiconductors) was used to inject light into the rod at one end. The illuminated appearance of the first light extractors is shown in FIG. 8A. The illuminated appearance of the second light extractors is shown in FIG. 8B.

Example 2: Lightguide with Diffusive Strip

Figure 9A:
FIGS. 9A-B are photographs of a lightguide of Example 2.
Figure 9B:

A 5 mm diameter acrylic light pipe was used as a lightguide in this example (light pipe 2058296 available from Tyco Electronics). A white diffusive strip was coextruded onto the light pipe's surface. This diffusive strip acted as a first light extractor. The illuminated appearance of the diffusive strip is shown in FIG. 9A. 11 notches were formed in the light pipe's surface using a razor blade to provide second light extractors. The first light extractor was arranged along a first axis and the second light extractors were arranged along a second axis. The first and second axes subtended an angle of 45 degrees at a main axis of the light pipe. An LED (Osram CN5M) was used to inject light into the light pipe at one end. The illuminated appearance of the second light extractors is shown in FIG. 9B.

EMBODIMENTS

The following are a list of embodiments of the present disclosure.

Embodiment 1 is an elongated lightguide extended along a length of the lightguide and comprising pluralities of first and second light extractors extracting light that would otherwise be confined and propagate within the lightguide along the length of the lightguide primarily by total internal reflection, the first and second light extractors forming respective first and second patterns along the length of the lightguide, light extracted by the first light extractors exiting the lightguide primarily along a first direction, total light extracted by the first light extractors having a first brightness, light extracted by the second light extractors exiting the lightguide primarily along a second direction different from the first direction, total light extracted by the second light extractors having a second brightness substantially smaller than the first brightness, such that when the light extracted by the second light extractors is viewed along the second direction, the second, but not the first, pattern is visible.

Embodiment 2 is the lightguide of embodiment 1 having a circular cross-section in a direction perpendicular to the length of the lightguide.

Embodiment 3 is the lightguide of any one of embodiments 1-2, wherein the lightguide is an optical fiber.

Embodiment 4 is the lightguide of any one of embodiments 1-3, wherein the first light extractors are discrete and spaced apart and arranged along a first axis along the length of the lightguide, and the second light extractors are discrete and spaced apart and arranged along a different second axis along the length of the lightguide.

Embodiment 5 is the lightguide of embodiment 4 being centered on a main axis, wherein the first and the second axes subtend an angle between 45 to 90 degrees at the main axis.

Embodiment 6 is the lightguide of any one of embodiments 1-5, wherein each first and second light extractor is a notch formed in an exterior surface of the lightguide.

Embodiment 7 is the lightguide of any one of embodiments 1-6, wherein each first and second light extractor is a protrusion formed on an exterior surface of the lightguide.

Embodiment 8 is the lightguide of any one of embodiments 1-7, wherein at least one of the first and second light extractors extracts light primarily by scattering the light.

Embodiment 9 is the lightguide of any one of embodiments 1-8, wherein at least one of the first and second light extractors extracts light primarily by reflecting the light.

Embodiment 10 is the lightguide of any one of embodiments 1-9, wherein at least one of the first and second light extractors extracts light primarily by refracting the light.

Embodiment 11 is the lightguide of any one of embodiments 1-10, wherein at least one of the first and second patterns comprises a straight line pattern.

Embodiment 12 is the lightguide of any one of embodiments 1-11, wherein at least one of the first and second patterns comprises a wavy line pattern.

Embodiment 13 is the lightguide of any one of embodiments 1-12, wherein the second pattern comprises an indicia.

Embodiment 14 is the lightguide of any one of embodiments 1-13, wherein the indicia comprises one or more of a letter, a text or a logo.

Embodiment 15, is the lightguide of any one of embodiments 1-14, wherein the second brightness is less than 50% of the first brightness.

Embodiment 16 is the lightguide of any one of embodiments 1-15, wherein the second brightness is less than 30% of the first brightness.

Embodiment 17 is the lightguide of any one of embodiments 1-16, wherein the second brightness is less than 10% of the first brightness.

Embodiment 18 is the lightguide of any one of embodiments 1-17, such that when the light extracted by the first light extractors is viewed along the first direction, the first, but not the second, pattern is visible.

Embodiment 19 is the lightguide of any one of embodiments 1-18, wherein when the light extracted by the first light extractors is viewed along the first direction, neither the first nor the second pattern is visible.

Embodiment 20 is the lightguide of any one of embodiments 1-19, such that when the light extracted by the first light extractors is viewed from a viewing position along the first direction, the first pattern is visible having a brightest visible portion, wherein as the viewing position moves in a direction parallel to the length of the lightguide, the brightest visible portion also moves in the same direction.

Embodiment 21 is the lightguide of any one of embodiments 1-20, further comprising a plurality of third light extractors extracting light that would otherwise be confined and propagate within the lightguide along the length of the lightguide primarily by total internal reflection, the third light extractors forming a third pattern along the length of the lightguide, light extracted by the third light extractors exiting the lightguide primarily along a third direction different from the first and second direction.

Embodiment 22 is the lightguide of any one of embodiments 1-21, wherein the first light extractors are arranged randomly along the length of the lightguide.

Embodiment 23 is the lightguide of any one of embodiments 1-22, wherein the second light extractors are arranged randomly along the length of the lightguide.

Embodiment 24 is an illumination system, comprising:
a light source; and
an elongated lightguide extended along a length of the lightguide and receiving light from the light source from a first end of the lightguide, the lightguide comprising pluralities of first and second light extractors extracting light from the light source that would otherwise be confined and propagate within the lightguide along the length of the lightguide primarily by total internal reflection, the first and second light extractors forming respective first and second patterns along the length of the lightguide, light extracted by the first light extractors exiting the lightguide primarily along a first direction toward a first target area, total light extracted by the first light extractors having a first brightness, light extracted by the second light extractors exiting the lightguide primarily along a second direction different from the first direction toward a second target area different from the first target area, total light extracted by the second light extractors having a second brightness substantially smaller than the first brightness, light received by the first target area from the lightguide being reflected toward the second target area along a third direction different from the first and second directions, such that when the lightguide is viewed from the second target area along the second direction, the second, but not the first, pattern is visible, and when the first target area is viewed from the second target area along the third direction, neither the first nor the second pattern is visible.

Embodiment 25 is the illumination system of embodiment 24, wherein light received by the first target area from the lightguide is primarily diffusely reflected toward the second target area along the third direction.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. An elongated lightguide extended along a length of the lightguide and comprising: pluralities of first and second light extractors extracting light that would otherwise be confined and propagate within the lightguide along the length of the lightguide primarily by total internal reflection; and a lens disposed on an exterior surface of the lightguide, the first and second light extractors forming respective first and second patterns along the length of the lightguide, light extracted by the first light extractors exiting the lightguide primarily along a first direction, total light extracted by the first light extractors having a first brightness, light extracted by the second light extractors exiting the lightguide primarily along a second direction different from the first direction, total light extracted by the second light extractors having a second brightness substantially smaller than the first brightness, such that when the light extracted by the second light extractors is viewed along the second direction, the second, but not the first, pattern is visible, wherein one of the light extracted by the first light extractors and the light extracted by the second light extractors passes through the lens upon exiting the lightguide, and the other of the light extracted by the first light extractors and the light extracted by the second light extractors does not pass through the lens upon exiting the lightguide.

2. The lightguide of claim 1, having a circular cross-section in a direction perpendicular to the length of the lightguide.

3. The lightguide of claim 1, wherein the first light extractors are discrete and spaced apart and arranged along a first axis along the length of the lightguide, and the second light extractors are discrete and spaced apart and arranged along a different second axis along the length of the lightguide.

4. The lightguide of claim 1, wherein each first and second light extractor is a notch formed in an exterior surface of the lightguide.

5. The lightguide of claim 1, wherein each first and second light extractor is a protrusion formed on an exterior surface of the lightguide.

6. The lightguide of claim 1, wherein at least one of the first and second light extractors extracts light primarily by scattering the light.

7. The lightguide of claim 1, wherein at least one of the first and second light extractors extracts light primarily by reflecting the light.

8. The lightguide of claim 1, wherein at least one of the first and second light extractors extracts light primarily by refracting the light.

9. The lightguide of claim 1, wherein at least one of the first and second patterns comprises a straight line pattern.

10. The lightguide of claim 1, wherein at least one of the first and second patterns comprises a wavy line pattern.

11. The lightguide of claim 1, wherein the second pattern comprises an indicia.

12. The lightguide of claim 1, wherein the second brightness is less than 50% of the first brightness.

13. The lightguide of claim 1, wherein the second brightness is less than 30% of the first brightness.

14. The lightguide of claim 1, wherein the second brightness is less than 10% of the first brightness.

15. The lightguide of claim 1, such that when the light extracted by the first light extractors is viewed along the first direction, the first, but not the second, pattern is visible.

16. The lightguide of claim 1, wherein when the light extracted by the first light extractors is viewed along the first direction, neither the first nor the second pattern is visible.

17. The lightguide of claim 1, such that when the light extracted by the first light extractors is viewed from a viewing position along the first direction, the first pattern is visible having a brightest visible portion, wherein as the viewing position moves in a direction parallel to the length of the lightguide, the brightest visible portion also moves in the same direction.

18. The lightguide of claim 1 further comprising a plurality of third light extractors extracting light that would otherwise be confined and propagate within the lightguide along the length of the lightguide primarily by total internal reflection, the third light extractors forming a third pattern along the length of the lightguide, light extracted by the third light extractors exiting the lightguide primarily along a third direction different from the first and second direction.

19. The lightguide of claim 1, wherein the first light extractors are arranged randomly along the length of the lightguide.

20. The lightguide of claim 1, wherein the second light extractors are arranged randomly along the length of the lightguide.

21. The lightguide of claim 3, being centered on a main axis, wherein the first and the second axes subtend an angle between 45 to 90 degrees at the main axis.

22. The lightguide of claim 11, wherein the indicia comprises one or more of a letter, a text or a logo.

23. An illumination system, comprising:
a light source; and
an elongated lightguide extended along a length of the lightguide and receiving light from the light source from a first end of the lightguide, the lightguide-comprising a lens disposed on an exterior surface of the lightguide and pluralities of first and second light extractors extracting light from the light source that would otherwise be confined and propagate within the lightguide along the length of the lightguide primarily by total internal reflection, the first and second light extractors forming respective first and second patterns along the length of the lightguide, light extracted by the first light extractors exiting the lightguide primarily along a first direction toward a first target area, total light extracted by the first light extractors having a first brightness, light extracted by the second light extractors exiting the lightguide primarily along a second direction different from the first direction toward a second target area different from the first target area, total light extracted by the second light extractors having a second brightness substantially smaller than the first brightness, light received by the first target area from the lightguide being reflected toward the second target area along a third direction different from the first and second directions, such that when the lightguide is viewed from the second target area along the second direction, the second, but not the first, pattern is visible, and when the first target area is viewed from the second target area along the third direction, neither the first nor the second pattern is visible, wherein one of the light extracted by the first light extractors and the light extracted by the second light extractors passes through the lens upon exiting the lightguide, and the other of the light extracted by the first light extractors and the light extracted by the second light extractors does not pass through the lens upon exiting the lightguide.

24. The illumination system of claim 23, wherein light received by the first target area from the lightguide is primarily diffusely reflected toward the second target area along the third direction.

* * * * *